United States Patent [19]

Urda

[11] 4,016,684
[45] Apr. 12, 1977

[54] SAFETY LEVER LOCK
[75] Inventor: Paul Urda, South Waverly, Pa.
[73] Assignee: Ingersoll-Rand Company, Woodcliff Lake, N.J.
[22] Filed: Nov. 5, 1975
[21] Appl. No.: 629,051
[52] U.S. Cl. .......................... 51/170 R; 51/170 PT; 51/170 T; 74/526
[51] Int. Cl.$^2$ ....................................... B24B 24/00
[58] Field of Search ....... 51/170 PT, 170 T, 170 R; 74/526; 251/98, 99, 107, 109

[56] References Cited
UNITED STATES PATENTS

| | | | |
|---|---|---|---|
| 2,183,032 | 12/1939 | Roycroft | 251/109 X |
| 2,326,396 | 8/1943 | Schaedler | 51/170 T |
| 3,496,680 | 2/1920 | Hutchins | 51/170 T |

Primary Examiner—James L. Jones, Jr.
Attorney, Agent, or Firm—Walter C. Vliet

[57] ABSTRACT

A safety operating lever for hand tools or the like is disclosed. The lever is pivotally mounted at one end to the tool housing. Rotating of the lever about its pivot activates a valve causing the tool to operate. A safety lever lock is pivotally mounted to the safety lever at the end opposite the pivotal mounting to the tool housing. The safety lever lock is biased in a position which prevents the operating lever from rotating. To release the safety lever lock, it is necessary to physically rotate it about its pivot to a position approximately 90° from the locking position. In the second position, the operating lever may be rotated to activate the tool. The unique mounting of the safety lever lock permits release of the lock and operation of the lever with one hand.

2 Claims, 2 Drawing Figures

SAFETY LEVER LOCK

BACKGROUND OF THE INVENTION

The requirements for added safety to workers in industry have led to many attempts to produce safety operating levers which prevent accidental operation of a tool. In the past, these operating levers have required expensive, complicated, or awkward-to-use locking devices.

SUMMARY OF THE INVENTION

It is the object of this invention to provide a safety operating lever which is economical to fabricate, reliable and rugged in use, as well as provide the convenience of simple, one-handed operation. These and other objects are accomplished by an operating lever for hand tools and the like comprising: An elongated lever member pivotally attached at one end to a tool housing for activating a power control means; a stop means pivotally disposed on the elongated lever member from pivoting about the one end to avoid accidental activation of the power control means.

DESCRIPTION OF THE PREFERRED EMBODIMENT

Figure 2:
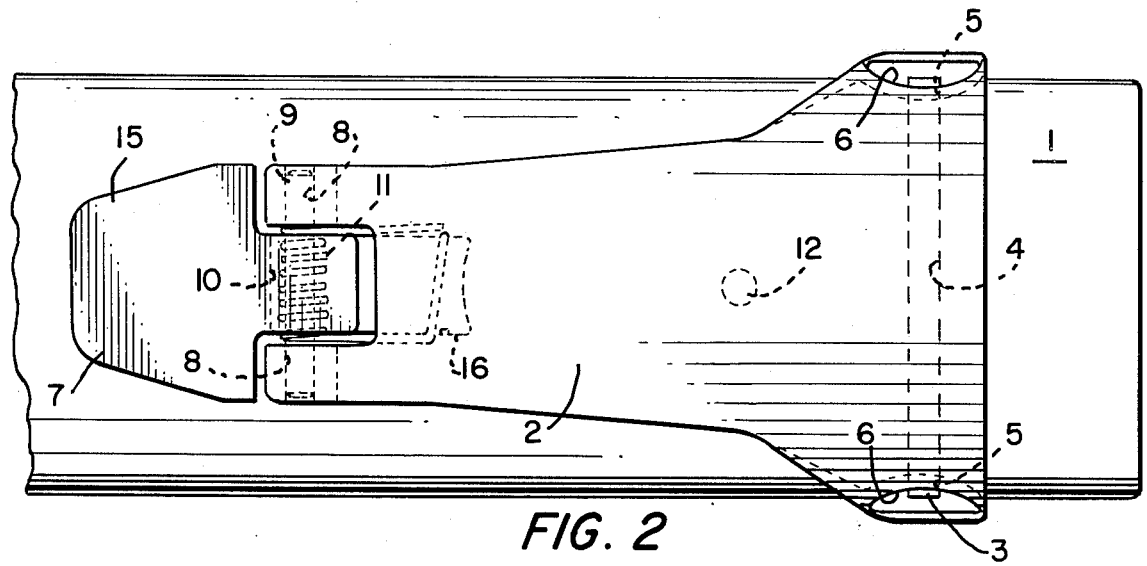
FIG. 2 is a plan view of the operating lever shown in FIG. 1.
Figure 1:
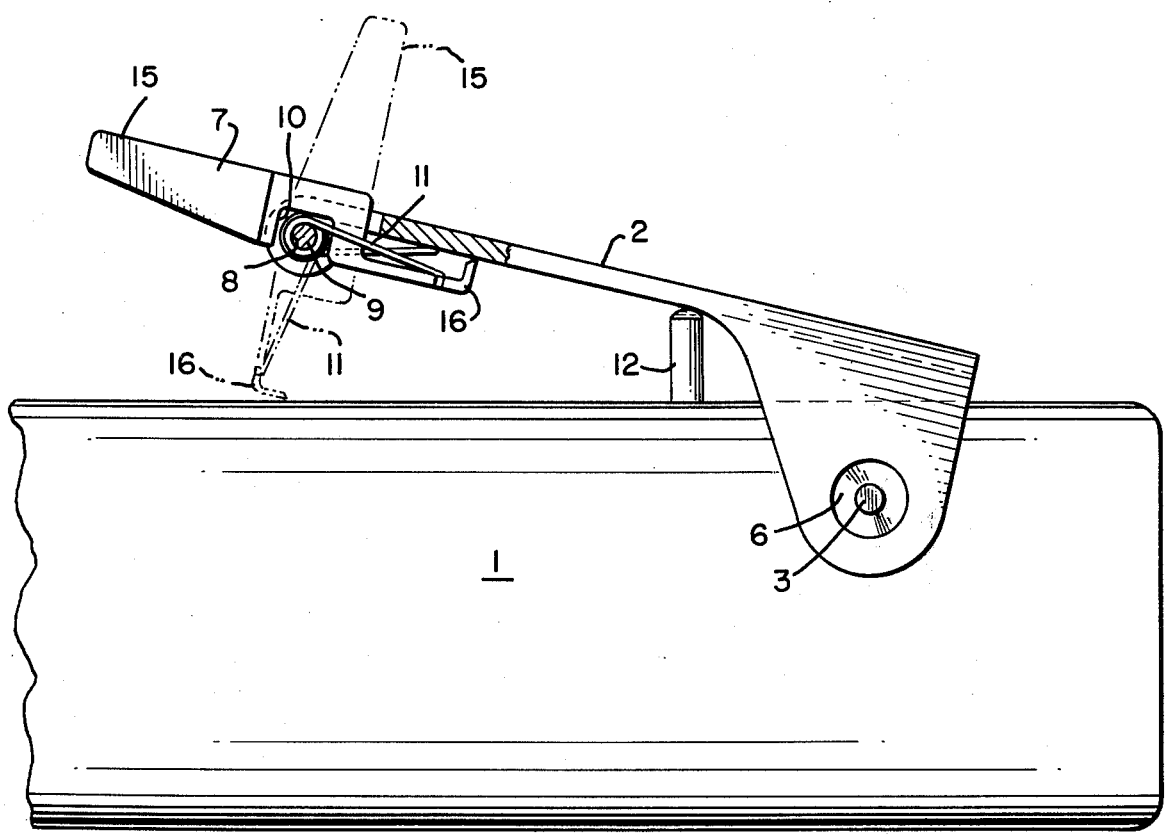
FIG. 1 is an elevation view of the safety lever of this invention shown mounted on a hand tool having a cylindrical body.

FIG. 1 shows the construction of a safety operating lever made in accordance with the teachings of this invention. A power tool such as an air-operated die grinder is shown by reference number 1. The safety operating lever 2 is shown pivotally mounted to the tool body by means of a pivot pin 3. A bore hole 4 is provided in the body of the tool to receive the pivot pin. The pivot pin 3 extends either side of the tool body a sufficient distance to engage a bearing hole 5 on either side of the safety operating lever 2. The safety operating lever is curved in a radius to extend around a substantial portion of the tool body in the area of the pivot pin and the bearing hole 5 is disposed within a dimpled recess 6. The dimpled recess 6 provides a point contact on its inner surface with the tool housing to prevent binding and prevents extension of the pivot pin beyond the outer surface of the operating lever, thus preventing the operator from contacting the potentially dangerous exposed end of the pivot pin.

The operating lever is shown extending generally axially along the body of the air-operated die grinder 1. At the end of the operating lever opposite the pivotal mount, a safety lever lock 7 is shown pivotally mounted to the safety operating lever. The pivotal mount for the safety lever lock is formed by means of two rolled end bearing surfaces 8 formed on the bifurcated end of the safety operating lever. The safety lever lock 7 is disposed between the forks and is secured by means of a pivot dowel pin 9 which is disposed in the rolled end bearing surfaces 8 and passes through a slot 10 in the safety lever lock 7. The safety lever lock or stop means is comprised of two parts. The thumb contact or lever extending tab 15 and the tool body contacting tab 16.

A torsion spring 11 is provided which tends to rotate safety lever lock 7 into a position which prevents rotation of the safety operating lever 2 about its pivot pin 3. The locked position is shown by means of broken lines in FIG. 1. The pivotal mounting of the safety lever lock 7 allows it to be rotated from its first locking position substantially perpendicular to the axis of the safety operating lever to a second position substantially in line or parallel to the operating lever. In the second position, the safety lever lock forms essentially a continuation of the safety operating lever and allows rotation of the safety operating lever 2 about pivot pin 3. Torsion spring 11 assists in retaining the safety lever lock in contact with its slot on pivot pin 3.

As can be seen in FIG. 1, rotation of the safety operating lever about pivot pin 3 in a counterclockwise direction will depress a power control means or valve stem member 12 and thereby cause an air valve (not shown) to be opened and further thereby to permit the air-operated die grinder tool 1 to begin operation.

Generally, air-operated die grinders are manufactured with a diameter sufficiently small for the operator to grasp the tool and hold and operate it with one hand thus allowing his other hand to be free to hold the part to be ground. The placing of the safety lever lock in the position at the end opposite the pivot pin 3 and constructing it in such a manner that it may be operated by the tip of the operator's thumb is advantageous to one-handed operation.

In operation, the operator merely has to grasp the tool with his thumb substantially along the axis of the safety operating lever and in contact with the safety lever lock 7. Operation merely requires that in safety lever lock 7 be pushed by the tip of the thumb in a direction to cause it to rotate counterclockwise about dowel pin 9 (the second position shown in FIG. 1 by solid lines). In this position, the safety operating lever may be depressed towards the tool body and thereby power control means 12 is depressd and the tool will operate. To stop operation and reset the locking device, it is necessary for the operator to merely release pressure on the safety operating lever. The torsion spring 11 will bias the safety lever lock and thereby the safety operating lever back to the initial off-lock position.

It can be readily appreciated that the safety operating lever 2 cannot be operated without the combination motion described above, and therefore cannot be accidentally depressed without the required combination motion.

Having now described the preferred embodiment of my invention, it should be obvious to one skilled in the art that several modifications of the specific structure may be made without departing from the spirit or scope of the invention. For example, any means of pivoting the safety operating lever or allowing it to rotate relative to the tool body may be utilized. The safety operating lever may be utilized to actuate an air valve, electric switch, or any other power activating means for the tool. The activation may be made by linear depression of the activating member as shown in the preferred embodiment or by pivotal or rotational movement of the operating lever. In addition, the operating lever may take any convenient shape or form suitable for the associated tool. The safety lever lock may be mounted in many equivalent ways and caused to rotate by many equivalent means; for example, a plastic hinge and/or bent leaf spring. I do not wish to be limited in the scope of the invention except as defined by the claims.

I claim:

1. An operating lever for hand tools and the like comprising:
   an elongated lever member pivotally attached at one end to a tool handle for hand activating a power control means;
   said tool handle being generally cylindrical in shape having an axial dimension greater than its diameter;
   said elongated lever extending generally axially along said tool handle and having a shape generally conformable to said tool handle without substantial radial projection;
   said tool handle having a diameter small enough to be held in one hand and said operating lever being able to be operated by the same hand;
   a stop means pivotally disposed on said elongated lever member at its other end;
   said stop means comprising a lever extending tab and a tool body contacting tab disposed radially about a pin means;
   said lever extending portion and said tab body contacting portion being essentially coplaner; and
   said stop means being positioned for ready deflection by the operator's thumb from a first position wherein said stop means is positioned substantially perpendicular to the axis of said elongated lever member and prevents said lever member from rotating, to a second position of said stop means substantially parallel to and coplanar with the axis of said lever means in which position said lever means may be rotated to engate said activating control means, whereby the operator may conveniently and comfortably hold and operate said tool without the danger of accidental tool operation.

2. The operation lever of claim 1 wherein:
   said hand tool is an air-operated die grinder and said elongated lever member operates an air valve to initiate tool operation.

* * * * *